April 27, 1937.  L. S. SHELDRICK  2,078,420

MOTOR VEHICLE

Filed March 9, 1936  3 Sheets-Sheet 1

INVENTOR.
L. S. Sheldrick
BY
ATTORNEY

April 27, 1937.　　　L. S. SHELDRICK　　　2,078,420
MOTOR VEHICLE
Filed March 9, 1936　　　3 Sheets-Sheet 2
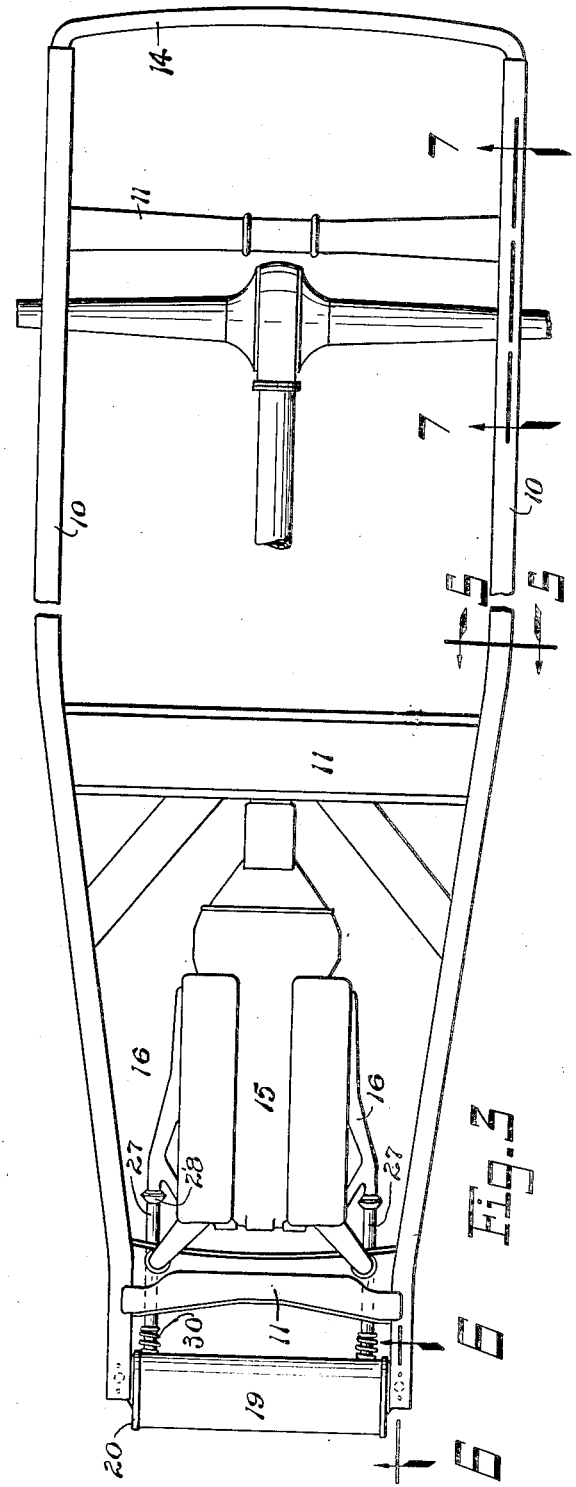
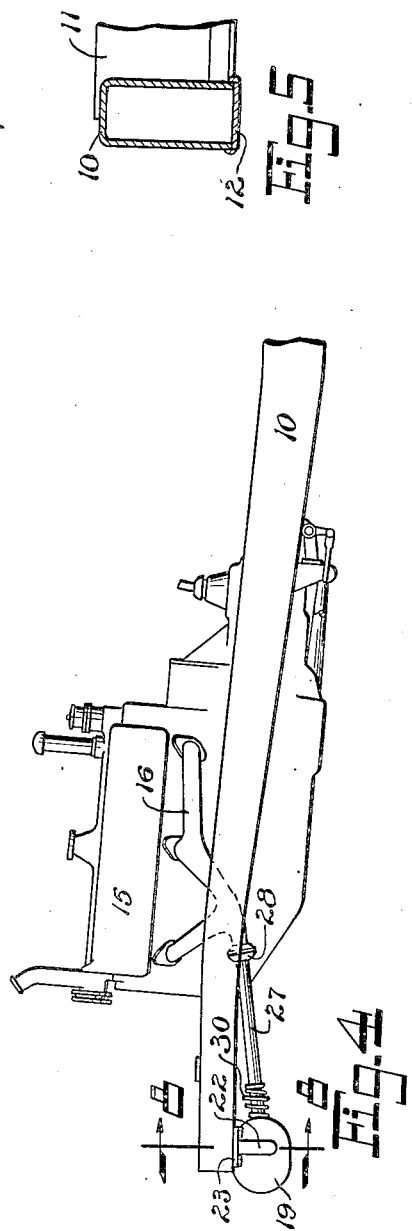
INVENTOR.
L. S. Sheldrick
BY
ATTORNEY.

April 27, 1937. L. S. SHELDRICK 2,078,420
MOTOR VEHICLE
Filed March 9, 1936 3 Sheets-Sheet 3
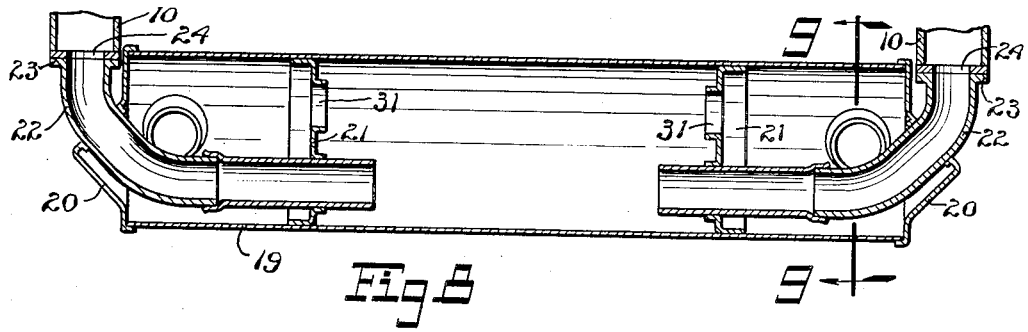
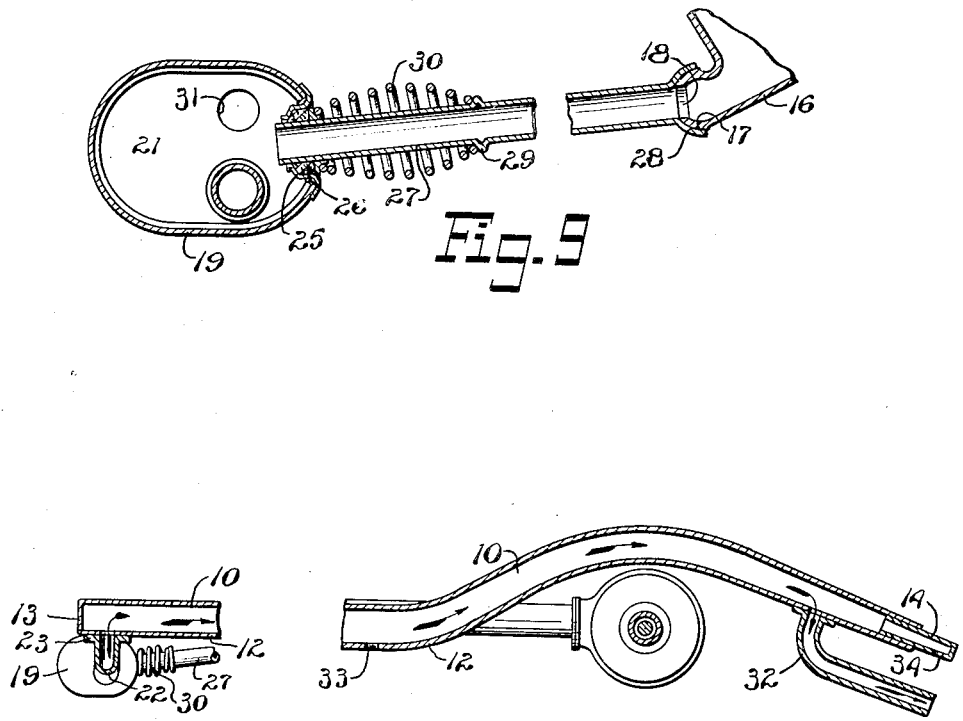
INVENTOR.
L. S. Sheldrick
BY
ATTORNEY.

Patented Apr. 27, 1937

2,078,420

UNITED STATES PATENT OFFICE 2,078,420

MOTOR VEHICLE

Laurence S. Sheldrick, Dearborn, Mich., assignor to Ford Motor Company, Dearborn, Mich., a corporation of Delaware Application March 9, 1936, Serial No. 67,876

6 Claims. (Cl. 180—54)

The object of my invention is to provide a motor vehicle wherein the side members of the chassis frame conduct the exhaust gases from the engine to the rear of the vehicle.

Still a further object of my invention is to provide means for more efficiently cooling the exhaust gases by locating the muffler at the front of the car adjacent to the engine, and then conducting the cooled gases to the rear of the car, whereby the back pressure in the exhaust system is reduced to thus increase the output of the motor, especially at higher engine speeds. In the conventional car the hot exhaust gases are conducted from the engine rearwardly through a more or less irregular shaped exhaust pipe to the center part of the chassis, where the muffler is located. The gases are not materially cooled before they reach the muffler and consequently, retain substantially the same volume as when discharged from the motor. For this reason the gas velocity is extremely high in the exhaust pipe between the motor and the muffler. The high gas velocity combined with the irregular shaped exhaust pipe produces an unavoidable back pressure in the system which materially reduces the output of the motor at high speeds.

A novel feature of this invention is that the muffler is placed in front of the engine where it is efficiently cooled and relatively short and straight exhaust pipes conduct the gases from the motor to the muffler. The gases being cooled in the muffler are reduced in volume so that the gas velocity from the muffler to the tail pipe is proportionately lower. The only high gas velocity occurs in the straight short pipes connecting the motor to the muffler. Even with high gas velocity in these pipes friction is low, due to the shortness of the pipes and their straight shape. Back pressure on the exhaust system is thus materially reduced.

Still a further object of my invention is to provide a single muffler for the exhaust gases from both cylinder banks of a V-type motor, and to provide two tail pipes, which conduct the gases from this muffler to the rear of the car. Each tail pipe is arranged to conduct half of the gases from both banks of cylinders so that the pressure impulses in each pipe correspond to the total number of explosions in the engine. This feature is especially important where the firing order of the engine does not alternate uniformly back and forth from one cylinder bank to the other. In the past it has been customary, where two tail pipes have been used, to conduct the gases from each cylinder bank to separate mufflers and to extend a tail pipe from each muffler to the rear of the car. The exhaust impulses in each muffler and connecting pipe system thus correspond to the explosions in only one bank of cylinders.

The applicant is believed to be the first to provide two exhaust pipes for a V-type motor so as to reduce the velocity therein, while maintaining the frequency of the pressure impulses in both pipes corresponding to the frequency of the explosions in the combined cylinder blocks. By this means quieter operation with reduced back pressure in the muffler is obtained.

Because the muffler is disposed transversely across the front of the car, it is much more efficiently cooled than is possible in the conventional arrangement which further reduces the amount of baffling required in the muffler to dampen out the pressure and sound waves from the engine.

Still a further object of my invention is to provide a novel enclosure for the muffler, as positioned across the front of the car, which enclosure will hide the muffler from view but will not obstruct the flow of air thereto, due to the forward motion of the car.

Still a further object of my invention is to provide a chassis frame having tubular side members and to connect the muffler to the front end of these members, whereby the exhaust gases may be conducted through the frame to the rear of the car. A result of this construction is that the conventional exhaust pipe is eliminated and the frame construction which has heretofore been altered to accommodate this pipe is simplified.

With these and other objects in view, my invention consists in the arrangement, construction and combination of the various parts of my improved device, as described in the specification, claimed in my claims and illustrated in the accompanying drawings, in which:

Figure 3 is a top view of my imroved chassis.

Figure 4 is a side view of the front part of the chassis, shown in Figure 3.

Figure 5 is a sectional view, taken on the line 5—5 of Figure 3.

Figure 6 is a sectional view, taken on the line 6—6 of Figure 3.

Figure 7 is a sectional view, taken on the line 7—7 of Figure 3.

Figure 8 is a sectional view, taken on the line 8—8 of Figure 4, and

Figure 9 is a sectional view, taken on the line 9—9 of Figure 8.

Figure 1:
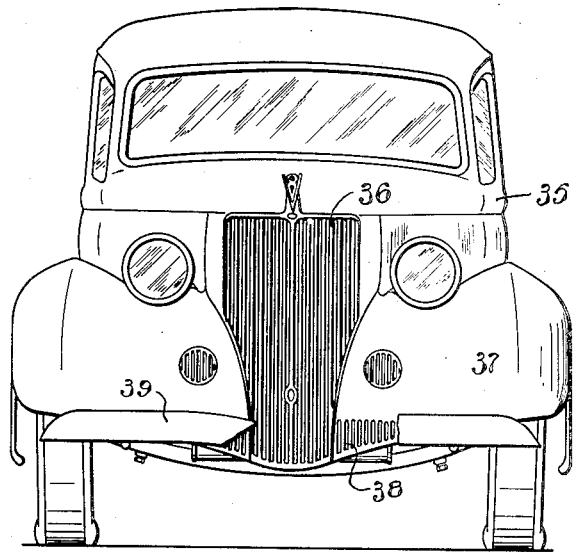
Figure 1 is a front view of an automobile having my invention incorporated therein, part of the bumper being broken away to better illustrate the fender louvers which conduct air to the transverse muffler.

Referring to the accompanying drawings, I have used the reference numeral 10 to indicate the side members of a chassis frame, these side members being connected by center and end cross members 11. The side members 10 are each of tubular construction, as shown in Figure 5, the bottom plate 12 being arc welded to an inverted channel shaped section to form a box shaped section. The front end of each of the side members 10 is closed, as at 13, each rear end being provided with a bumper support 14 which forms a closure for the rear end of each tubular side member.

A V-type motor 15 is mounted between the front and center cross members 11 in the conventional manner, the motor having a pair of exhaust manifolds 16 secured to the respective sides thereof. As will be noted from Figure 9, an exhaust port 18 is formed in each manifold 16, these ports having spherical seats 17 therearound, the axis of each seat extending in a substantially horizontal direction towards the forward end of the car. Means will subsequently be described whereby the exhaust gases from the exhaust ports 18 are conducted forwardly to a muffler which extends transversely between the two side members 10 at the extreme front end of the car.

The muffler comprises an oval shaped shell 19 having end plates 20 and intermediate baffle plates 21. An L-shaped pipe 22 extends through each of the end plates and adjacent baffle plate 21 to a point spaced about six inches from the middle of the shell 19. The outer ends of the pipes 22 are each provided with a flange 23 which flange is adapted to be bolted to the underside of the adjacent side member 10 at the forward end thereof, these side members each having an opening 24 therein aligned with the adjacent flange 23, whereby exhaust gases may flow from the center portion of the muffler through the pipes 22 into the tubular side members 10.

Referring to Figure 9, it will be noted that each end of the shell 19 is provided with an annular pocket 25 in which a ring shaped packing 26 is disposed. An exhaust pipe 27 is adapted to closely fit the opening in each packing 26, which pipes extend rearwardly and are provided with spherical seats 28 thereon which are adapted to respectively fit against the seats 17. An annular shoulder 29 is formed around each pipe 27 and barrel springs 30 are compressed between these shoulders and the packings 26 to thereby resiliently urge the pipes 27 rearwardly so that the seats 28 fit against the seats 17 and resiliently urge the packings 26 forwardly so as to fit within the pockets 25. When it is desired to remove the pipes 27 it is only necessary to push same forwardly and then drop the rear end downwardly and withdraw it from beneath the manifold 16.

Each of the baffle plates 21 is provided with an opening 31 whereby the exhaust gases may flow from the ends of the muffler to the center thereof. The flow of the gas is then reversed and flows outwardly through the pipes 22 into the frame side members.

From the foregoing it will be seen that the exhaust impulses from both banks of cylinders are conducted to the middle chamber of the muffler and flow outwardly therefrom through the two pipes 22, into both frame side members. The frame member at one side of the car does not conduct the exhaust gases from only one bank of cylinders but is used to conduct half of the exhaust gases from both banks, thereby equalizing the pressure and sound waves set up by the intermittent explosions in the motor.

Referring to Figure 7 it will be noted that a pipe 32 is bolted to the underside of each of the frame side members 10 near the extreme outer ends thereof, this pipe being aligned with an opening in the frame whereby the exhaust gases at the end of the frame travel downwardly and outwardly through the pipe 32. A relatively small opening 33 is provided in the bottom plate 12 just forwardly of that portion of the frame which rises to clear the rear axle and similar openings 34 are provided in the bumper supports 14. The purpose of the openings 33 and 34 is to provide openings whereby water vapor condensation may drip out of the frame.

Figure 2:
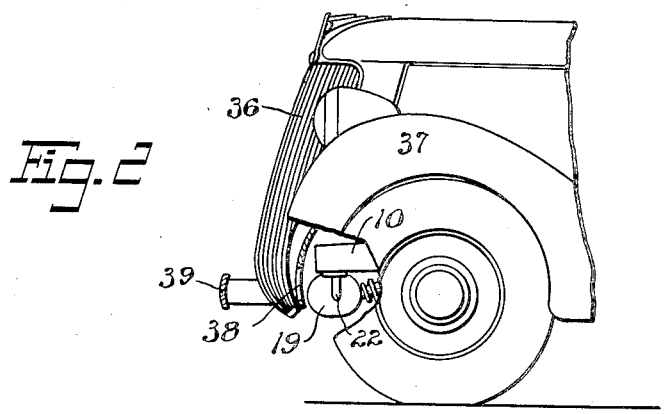
Figure 2 is a side view of the front portion of the car shown in Figure 1, part being sectioned to better illustrate the construction.

Referring to Figures 1 and 2, it will be noted that a more or less conventional vehicle body 35 is provided, this body having a radiator grille 36 disposed in the conventional manner at the front end of the car. The radiator grille 36 extends downwardly over the intermediate portion of the muffler, the upper portion of the grille forming a closure for the radiator of the car while the lower portion allows the air to blow against the intermediate portion of the muffler. Conventional fenders 37 are provided, these fenders having a plurality of vertical louvers 38 formed therein in position in front of the ends of the muffler. These louvers have been designed so as to form a continuation of the grille 36. The lower portion of the grille 36 together with the fenders 37 forms a closure which hides the muffler from view, while at the same time allowing incoming air, caused by the forward movement of the car, to blow against the full length of the muffler.

A bumper 39 of the conventional design is spaced forwardly from the grille 36 substantially in front of the lower portion of the grille and the louvers 38. This bumper does not shield the louvers from the horizontal air current, as it is spaced forwardly therefrom a sufficient distance that the flow of air is not appreciably affected.

The principal advantage resulting from this construction is that the exhaust gases immediately upon leaving the pipes 27 are effectively cooled so that the volume of the gas is appreciably reduced at this point. Consequently, high gas velocities occur only in the pipes 27. The gases then flow towards the center of the muffler, the resultant cooled gas then flowing out through the two pipes 22 into the tubular side members. The gases are quite cool when they enter these side members so that the volume is materially reduced. The velocity of the gas in the side members 10 is only a small fraction of that flowing through the conventional exhaust pipe. Consequently, a reduction in back pressure results. Still further, in the conventional chassis the muffler extends lengthwise and is not near as effectively cooled as is the muffler in the applicant's installation. Thus, the applicant is able to effectively muffle the sound of the exhaust with a much reduced back pressure on the system.

Some changes may be made in the arrangement, construction, and combination of the various parts of my improved device without departing from the spirit of my invention and it is my intention to cover by my claims such changes as may reasonably be included within the scope thereof.

I claim as my invention:

1. A vehicle chassis construction comprising, a frame having a pair of longitudinally extending tubular side members, a V-type motor mounted in the front end of said frame, a muffler extending transversely between said side members just forwardly of said motor, means for conducting the exhaust gases from the both banks of cylinders in said motor to the respective ends of said muffler, said exhaust gases flowing through said muffler to a common center chamber, and means for conducting the exhaust gases from said center chamber in substantially equal amounts to each of said tubular side members, said side members conducting the gases to the rear of the vehicle.

2. A vehicle chassis construction comprising, a frame member, a V-type motor mounted in the forward end of said frame member, a muffler transversely secured to said frame member adjacent to said motor, an exhaust manifold associated with each cylinder block of said motor, an exhaust pipe extending between each manifold and the adjacent end of said muffler, whereby the exhaust gases from both cylinder blocks are conducted to the ends of said muffler, means for conducting the gases from the ends of the muffler to a common center chamber, a pair of exhaust pipes extending the length of the vehicle, and means for conducting substantially equal amounts of exhaust gas from the common chamber in said muffler into each of said longitudinally extending exhaust pipes, for the purpose described.

3. A vehicle chassis construction comprising, a frame member, a V-type motor mounted in the forward end of said frame, a muffler extending transversely across said frame in front of said motor, an exhaust manifold associated with each cylinder block of said motor, relatively straight quickly detachable exhaust pipe extending between each manifold and the respective ends of said muffler so as to conduct the exhaust gases from both of said cylinder blocks into said muffler, said muffler having a common gas receiving chamber therein, a pair of exhaust pipes extending the length of said vehicle, and means for conducting the exhaust gases from said common chamber in the muffler equally to each of said exhaust pipes.

4. A vehicle chassis construction comprising, a frame member having a pair of tubular side members, a V-type motor mounted in the forward end of said frame, a muffler extending across said frame member in front of said motor, an exhaust manifold associated with each cylinder block of said motor, an exhaust pipe extending between each manifold and the respective ends of said muffler so as to conduct the exhaust gases from the manifold into the ends of said muffler, and means for conducting the exhaust gases from said muffler into the front ends of said tubular side members, said side members conducting said exhaust gases to the rear of the vehicle, for the purpose described.

5. A vehicle chassis construction comprising, a frame having a pair of tubular side members, a V-type motor mounted within said frame adjacent to the front end thereof, a muffler extending transversely between said side members and positioned forwardly of said motor, an exhaust manifold associated with each cylinder block of said motor, a quickly detachable exhaust pipe extending between each manifold and said muffler, said exhaust pipes conducting the exhaust gases from said manifolds into the ends of said muffler from which said gases flow into a common center chamber in the muffler, and a pipe extending from the muffler to each of said tubular side members so as to conduct the exhaust gases from said center chamber through both frame side members to the rear of the vehicle.

6. A vehicle chassis construction comprising, a frame having tubular side members, a V-type motor mounted in said frame at the forward end thereof, an exhaust manifold associated with each bank of cylinders of said motor, a muffler extending transversely between said frame members at the forward end thereof, an exhaust pipe extending between each of said manifolds and the adjacent end of said muffler whereby exhaust gases are conducted from both banks of cylinders into said muffler at the ends thereof, said exhaust gases flowing inwardly from the ends of the muffler to a common chamber in the center of said muffler, a pipe extending from said common chamber outwardly through each end of said muffler, said pipes being secured to said tubular frame members in alignment with openings therein so as to conduct exhaust gases from the muffler through said side members to the rear of the vehicle, and a radiator grille and chassis fenders forming a closure for the full length of said muffler, said grille and fenders having louvers therein in horizontal alignment with said muffler, for the purpose described.

LAURENCE S. SHELDRICK.